United States Patent
Motohashi

(10) Patent No.: US 10,655,812 B2
(45) Date of Patent: May 19, 2020

(54) VEHICLE LAMP

(71) Applicant: Koito Manufacturing Co., Ltd., Tokyo (JP)

(72) Inventor: Kazuya Motohashi, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 16/124,677

(22) Filed: Sep. 7, 2018

(65) Prior Publication Data

US 2019/0086051 A1 Mar. 21, 2019

(30) Foreign Application Priority Data

Sep. 20, 2017 (JP) ................. 2017-179694

(51) Int. Cl.
| | |
|---|---|
| *F21S 41/27* | (2018.01) |
| *F21S 41/663* | (2018.01) |
| *F21S 41/143* | (2018.01) |
| *B60Q 1/14* | (2006.01) |
| *F21S 41/151* | (2018.01) |

(Continued)

(52) U.S. Cl.
CPC ............. *F21S 41/27* (2018.01); *B60Q 1/143* (2013.01); *B60Q 1/1423* (2013.01); *F21S 41/143* (2018.01); *F21S 41/151* (2018.01); *F21S 41/153* (2018.01); *F21S 41/255* (2018.01); *F21S 41/265* (2018.01); *F21S 41/663* (2018.01); *B60Q 2300/056* (2013.01); *B60Q 2300/41* (2013.01)

(58) Field of Classification Search
CPC .......... F21S 41/25; F21S 41/27; F21S 41/295; F21S 41/265; F21S 41/20; F21S 41/285; F21V 5/04; F21V 5/008
See application file for complete search history.

(56) References Cited

U.S. PATENT DOCUMENTS

| | | | |
|---|---|---|---|
| 6,414,802 B1 * | 7/2002 | Betensky | ................. G02B 9/12 359/716 |
| 7,271,965 B1 | 9/2007 | Oskotsky et al. | |

(Continued)

FOREIGN PATENT DOCUMENTS

| | | |
|---|---|---|
| JP | 2015-222687 A | 12/2015 |
| KR | 10-2014-0052645 A | 5/2014 |

(Continued)

OTHER PUBLICATIONS

An Office Action dated Aug. 13, 2019, issued from the Korean Intellectual Property Office (KIPO) of Korean Patent Application No. 10-2018-0105792 and an English translation thereof.

*Primary Examiner* — Julie A Bannan

(74) *Attorney, Agent, or Firm* — Abelman, Frayne & Schwab

(57) ABSTRACT

Disclosed is a vehicle lamp including: a light source; and a projection lens that projects light emitted from the light source. The projection lens is constituted by a triplet lens including a first lens having a positive refractive power, a second lens having a negative refractive power, and a third lens having a positive refractive power, and a first inter-lens distance ($t1$) between the first lens and the second lens, a second inter-lens distance ($t2$) between the second lens and the third lens, and a total lens thickness ($T$) of the projection lens are in a relationship that satisfies $0.03<t1/T<0.1$ and $0.03<t2/T<0.1$.

10 Claims, 4 Drawing Sheets

(51) Int. Cl.
  *F21S 41/265* (2018.01)
  *F21S 41/153* (2018.01)
  *F21S 41/255* (2018.01)

(56) References Cited

U.S. PATENT DOCUMENTS

| | | | | |
|---|---|---|---|---|
| 2010/0027251 | A1* | 2/2010 | Shpizel | F21L 4/005 |
| | | | | 362/187 |
| 2016/0109074 | A1* | 4/2016 | Hirasawa | F21K 9/64 |
| | | | | 362/511 |
| 2016/0215947 | A1* | 7/2016 | Matsuno | F21S 41/24 |
| 2016/0347236 | A1* | 12/2016 | Yatsuda | B60Q 1/085 |
| 2017/0138555 | A1* | 5/2017 | Hirasawa | B60Q 1/14 |
| 2018/0010757 | A1* | 1/2018 | Eun | F21S 41/265 |
| 2018/0348503 | A1* | 12/2018 | Hall | G02B 27/0172 |

FOREIGN PATENT DOCUMENTS

| KR | 10-2016-0077726 A | 7/2016 |
|---|---|---|
| KR | 10-2017-0079455 A | 7/2017 |

* cited by examiner $$z(r) = \frac{r^2/R}{1+\sqrt{1-(1+k)(r/R)^2}} + \alpha_1 r^4 + \alpha_2 r^6 \cdots \quad (1)$$

|  | R | k | $\alpha_1$ | $\alpha_2$ | THICKNESS |
|---|---|---|---|---|---|
| FIRST SURFACE | 36.36813 | -0.1864062 | -1.37E-06 | -4.01E-10 | 25 |
| SECOND SURFACE | -57.8413 | -2.534326 | 3.57E-06 | -4.61E-11 | 4.584172 |
| THIRD SURFACE | -24.2092 | -6.567203 | 5.20E-06 | -2.39E-09 | 7.804421 |
| FOURTH SURFACE | 63.62946 | -32.61691 | 1.64E-05 | -6.21E-09 | 2.364366 |
| FIFTH SURFACE | 23.19157 | -5.909102 | 4.85E-06 | -3.14E-09 | 25 |
| SIXTH SURFACE | -39.8728 | -5.586149 | -2.87E-06 | -8.81E-10 | 26.96641 |

VEHICLE LAMP

CROSS-REFERENCE TO RELATED APPLICATIONS

This application is based on and claims priority from Japanese Patent Application No. 2017-179694, filed on Sep. 20, 2017, with the Japan Patent Office, the disclosure of which is incorporated herein in its entirety by reference.

TECHNICAL FIELD

The present disclosure relates to a lamp used for vehicles such as automobiles, and more particular, a vehicle lamp suitable for being applied to a headlight (a head lamp) capable of controlling adaptive driving beam (ADB) light distribution.

BACKGROUND

As for a head lamp of an automobile, as one of techniques to obtain light distribution for enhancing illumination effect in a front area of an own vehicle and preventing dazzling a vehicle existing in the front area of the own vehicle such as a preceding vehicle or an oncoming vehicle existing in the front area (hereinafter, referred to as a "front vehicle"), an ADB light distribution control has been proposed. The ADB light distribution control is performed in such a manner that a front vehicle is detected by a vehicle position detection device, a light amount in an area where the detected vehicle exists is reduced or the light is turned off, and the other wide areas are illuminated brightly.

In recent years, the ADB light distribution control is also applied to a head lamp which has a light-emitting element, for example, an LED as a light source, and combines light from a plurality of LEDs as light sources, that is, respective illumination areas of respective LEDs to form light distribution for illuminating the front area of the own vehicle. Then, when a front vehicle is detected, the LED in the illumination area corresponding to the detected front vehicle is dimmed or turned off.

In this ADB light distribution control, white light emitted from a plurality of LEDs is projected through a projection lens in the front area of the own vehicle to form a plurality of illumination areas. Then, a required illumination area is formed by appropriately combining and mixing the illumination areas. However, due to the spherical aberration, for example, the chromatic aberration caused by the projection lens, dispersion of light may occur at the peripheral portion of each illumination area, and the visibility of the illumination may be deteriorated.

In order to overcome the spherical aberration, particularly the chromatic aberration of the projection lens, Japanese Patent Application No. 2015-222687 proposes a projection lens in which adopts a doublet lens including a convex lens and a concave lens, and has a gap between the convex lens and the concave lens. Further, there is proposed a projection lens in which each surface of the convex lens and the concave lens is formed as an aspherical surface.

SUMMARY

The projection lens disclosed in Japanese Patent Application No. 2015-222687 is effective for improving the chromatic aberration, but the projection lens is not necessarily sufficient for astigmatism or coma aberration. Due to these aberrations, sharpness of periphery of each of the plurality of illumination areas or a periphery of the combined illumination areas is decreased, so that a boundary of the illumination areas becomes ambiguous. Therefore, when the ADB control is executed, light at the boundary of the illumination area adjacent to a dimmed or extinguished area may be irradiated to the front vehicle, and the light may cause the front vehicle to be dazzled.

The present disclosure is to provide a vehicle lamp that is provided with a projection lens which has a high sharpness capable of clarifying the boundary of the illumination areas.

A vehicle lamp of the present disclosure is a vehicle lamp including a light source and a projection lens that projects light emitted from the light source. The projection lens is constituted by a triplet lens including a first lens having a positive refractive power, a second lens having a negative refractive power, and a third lens having a positive refractive power. A first inter-lens distance t1 between the first lens and the second lens, a second inter-lens distance t2 between the second lens and the third lens, and a total lens thickness T of the projection lens are in a relationship that satisfies $0.03 < t1/T < 0.1$ and $0.03 < t2/T < 0.1$.

As a desirable embodiment of a vehicle lamp of the present disclosure, the light source is constituted by a plurality of light-emitting elements, and light emitted from the plurality of light-emitting elements is projected by the projection lens to form a plurality of corresponding illumination areas. Further, the plurality of light-emitting elements are configured to be individually controlled to emit light, thereby performing an ADB light distribution control.

According to the present disclosure, in the projection lens constituted by a triplet lens, the first inter-lens distance t1 between the first lens and the second lens, the second inter-lens distance t2 between the second lens and the third lens, and the total lens thickness T of the projection lens are designed to satisfy a predetermined relationship. Thus, the spherical aberration of the projection lens may be suppressed, whereas the sharpness may be increased.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
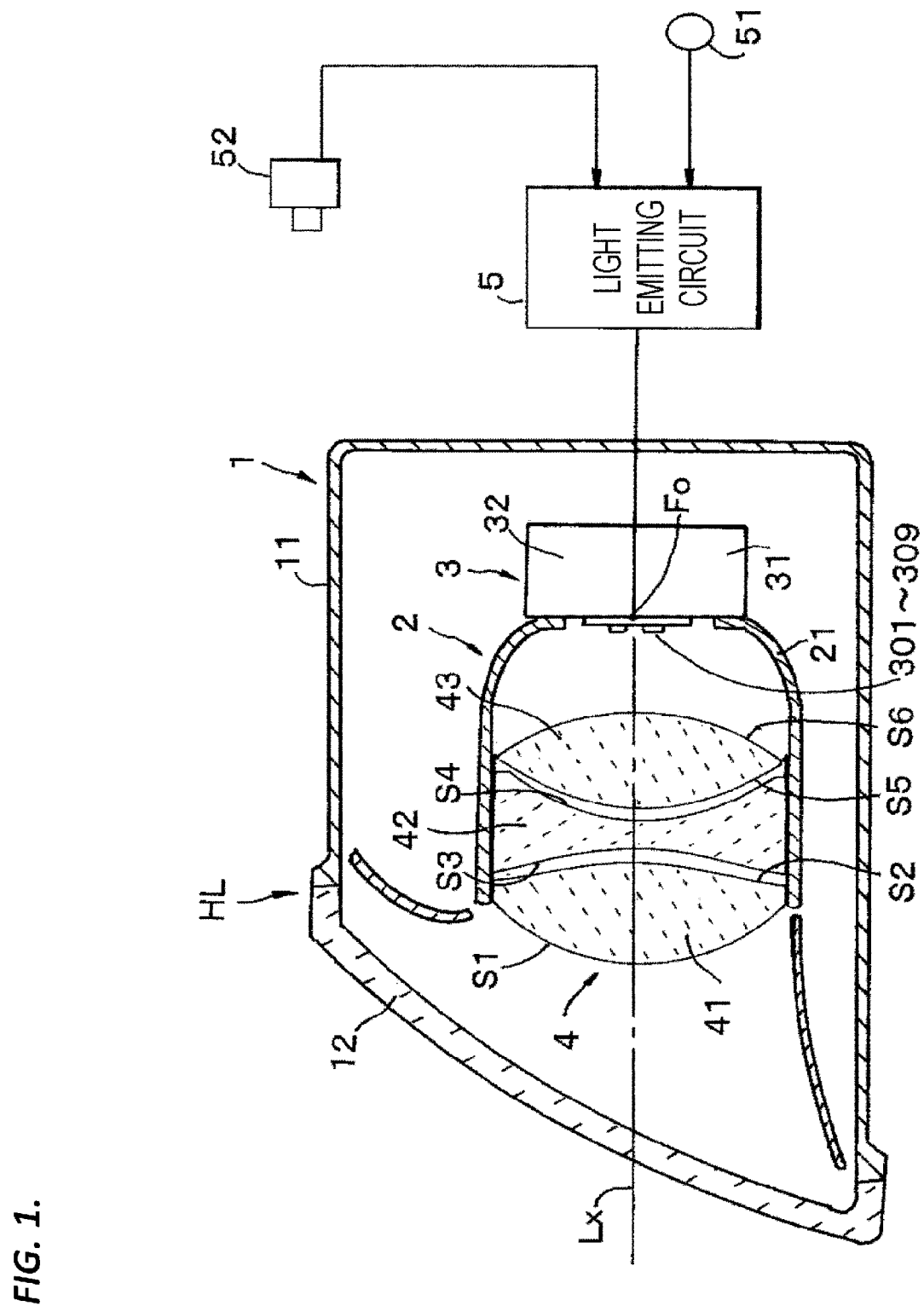
FIG. 1 is a schematic vertical sectional view of a head lamp to which the present disclosure is applied.

Next, an embodiment of the present disclosure will be described with reference to the drawings. FIG. 1 is a vertical sectional view of a conceptual configuration in which the present disclosure is applied to a head lamp HL of an automobile to which ADB light distribution control is applied. In the following description, for front or rear, a light source side with respect to a head lamp will be referred to as "rear", and a front side of the head lamp HL will be referred to as "front."

In the head lamp HL, a lamp unit 2 is provided inside a housing 1 formed by a lamp body 11 and a front cover 12 made of a light-transmissive material. The lamp unit 2 includes a light source 3 and a projection lens 4 provided or supported at a unit casing 21 whose inner surface is formed as a light-reflecting surface, and is configured to obtain desired light distribution by irradiating light emitted from the light source to a front area of an automobile by the projection lens 4.

Figure 2:
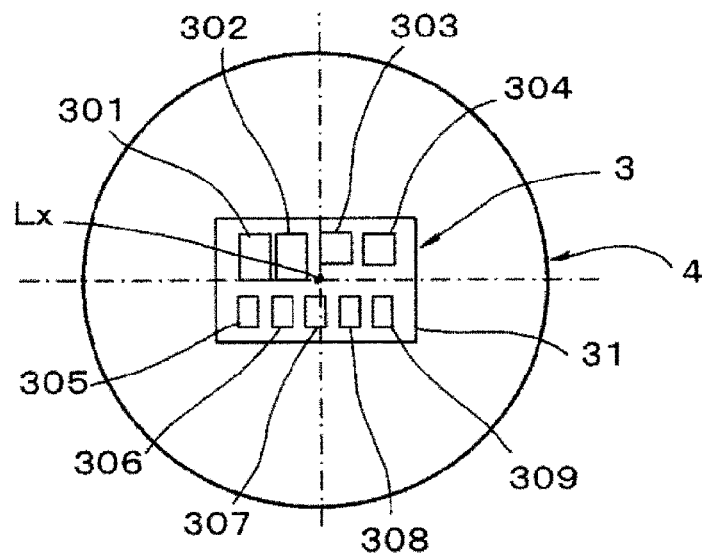
FIG. 2 is a perspective schematic view of a projection lens as viewed from the front.

FIG. 2 is a perspective schematic view of the projection lens 4 as viewed from the front, and as also illustrated in FIG. 1, the light source 3 is provided with a plurality of light-emitting elements 30 (here, nine light-emitting diode LED chips 301 to 309 that emit white light) mounted on a substrate 31 supported at a heat sink 32. These LED chips 301 to 309 are mounted in two upper and lower stages, that is, in a state where four LED chips 301 to 304 and five LED chips 305 to 309 are arranged in the upper stages and the lower stage in the horizontal direction, respectively. When these LED chips 301 to 309 emit light, the light emitted from each of the LED chips is directed to the projection lens 4 directly or after being reflected at an inner surface of the unit casing 21.

As illustrated in FIG. 1, the LED chips 301 to 309 are connected to a light-emitting circuit 5 through the substrate 31, and are controlled such that light emission, light extinction, and furthermore, emitted light intensity can be individually changed by the light-emitting circuit 5. An illumination switch 51 operated by a driver is connected to the light-emitting circuit 5. The light-emitting circuit 5 is capable of switching and setting low beam light distribution, high beam light distribution, and ADB light distribution by the illumination switch 51. Further, an in-vehicle camera 52 for executing the ADB control is connected to the light-emitting circuit 5. The light-emitting circuit 5 is configured to detect a front vehicle from a front image of the automobile captured by the in-vehicle camera 52, and perform a light distribution control that does not cause the front vehicle to be dazzled.

Figure 3:
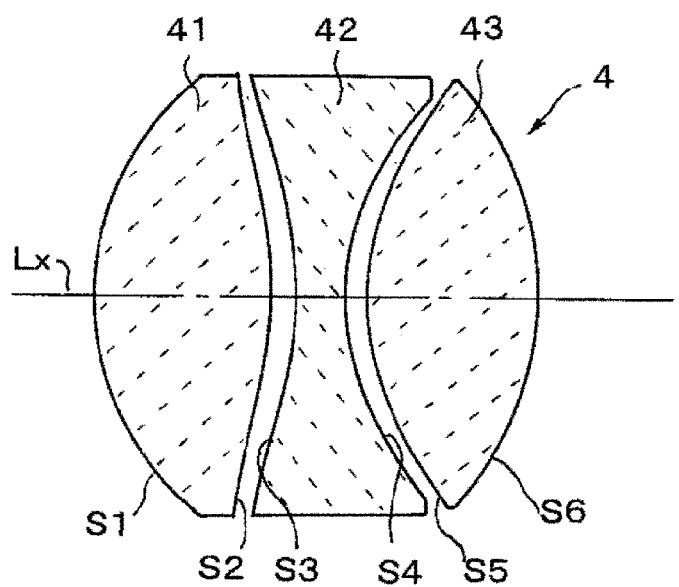
FIG. 3 is a cross-sectional view of the projection lens.

As illustrated in FIG. 3, the projection lens 4 is constituted by a triplet lens, and includes, in order from the front side of the lamp, a first lens 41 made of a convex lens having a positive refractive power, a second lens 42 made of a concave lens having a negative refractive power, and a third lens 43 made of a convex lens having a positive refractive power. In addition, the first lens 41 to the third lens 43 are coaxially arranged, and gaps in a direction along a lens optical axis Lx are secured between the first lens 41 and the second lens 42, and between the second lens 42 and the third lens 43. The light source 3, that is, each of the LED chips 301 to 309 is disposed in the vicinity of a focus Fo on the rear side of the lamp of the projection lens 4.

Figure 6A:
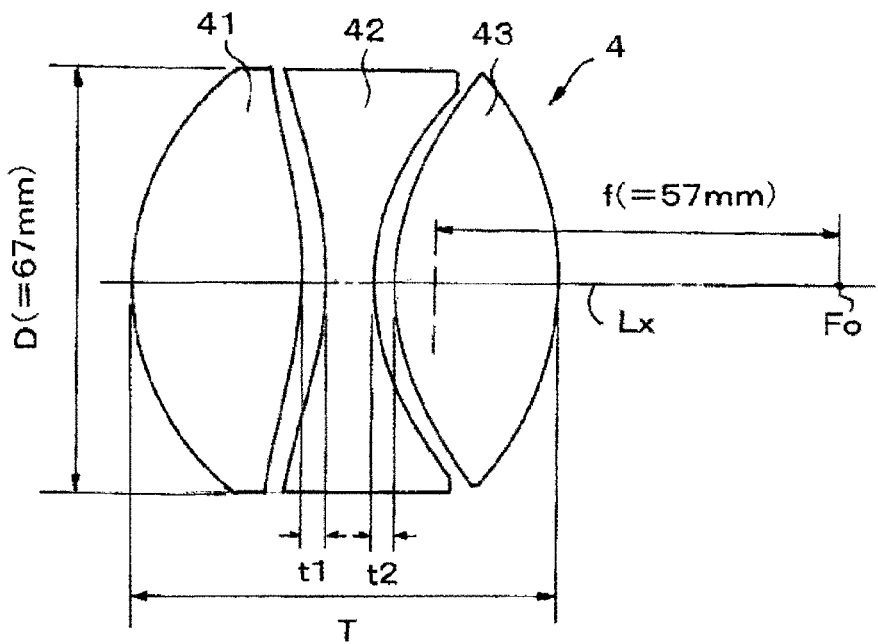
FIG. 6A is a conceptual view for explaining a dimension of each portion of a projection lens and FIG. 6B is a graph illustrating measured values of a spot radius of a lens of an embodiment.

Here, as will be described later with reference to FIGS. 6A and 6B, an inter-lens distance between the first lens 41 and the second lens 42 on the lens optical axis is defined as a first inter-lens distance t1, and an inter-lens distance between the second lens 42 and the third lens 43 on the lens optical axis Lx is defined as a second inter-lens distance t2. Further, a distance (dimension) from a first surface S1 of the first lens 41 to a sixth surface S6 of the third lens 43 on the lens optical axis Lx is defined as a total lens thickness T of the projection lens 4.

The first lens 41 to the third lens 43 which constitute the projection lens 4 are made of a light-transmissive material, for example, resin or glass, but the first lens 41 and the third lens 43 are formed of a light-transmissive material having a lower dispersion (high Abbe number), which has a lower refractive index than that of the second lens 42. For example, the first lens 41 and the third lens 43 are formed of crown glass, and the second lens 42 is formed of flint glass. Alternatively, the first lens and the third lens are formed of poly(methyl methacrylate) (PMMA) (acrylic resin), and the second lens 42 is formed of polycarbonate resin.

In order to decrease chromatic aberration, astigmatism, and coma aberration, in the projection lens 4, at least the first surface S1 to the fifth surface S5 are designed as aspherical surfaces, among the front surface (the first surface) S1 and the rear surface (the second surface) S2 of the first lens 41, the first surface (the third surface) S3 and the rear surface (the fourth surface) S4 of the second lens 42, and the first surface (the fifth surface) S5 and the rear surface (the sixth surface) S6 of the third lens 43. In the embodiment, all of the first surface S1 to the sixth surface S6 are designed as aspherical surfaces based on the aspherical definition formula (1) illustrated in FIG. 4. Here, z is a sag amount, r is a radial dimension from the optical axis, R is a radius of curvature, k is a conic constant, and $\alpha_1$ and $\alpha_2$ are aspherical coefficients.

In the head lamp HL of the embodiment provided with the projection lens 4 having the above-described configuration, the low beam light distribution control or the high beam light distribution control is set by, for example, switching the illumination switch 51 by the driver. In the low beam light distribution control, the four LED chips 301 to 304 in the upper stage emit light under the control of the light-emitting circuit 5. The white light emitted from the LED chips 301 to 304 is irradiated to the front area of the automobile by the projection lens 4, and in FIG. 5, light distribution in which illumination areas P1 to P4 are combined, that is, low beam light distribution is formed, which illuminates an area below a cut-off line substantially along the horizontal line H passing through the lens optical axis Lx.

In the high beam light distribution control, the five LED chips 305 to 309 in the lower stage emit light under the control of the light-emitting circuit 5. The white light emitted from the LED chips 305 to 309 is irradiated to the front area of the automobile by the projection lens 4, and becomes light distribution in which the illumination area P5 to P9 are combined. The light distribution is combined with the above-described low beam light distribution P1 to P4, so that high beam light distribution for illuminating a wider area is formed.

Meanwhile, when the ADB light distribution control is set by the driver, the light-emitting circuit 5, in principle, performs a control of the high beam light distribution and detects a front vehicle existing in the front area of the automobile based on an image captured by the in-vehicle camera 52. The illumination areas overlapping with the detected front vehicle, particularly the LED chips corresponding to the areas overlapping with the illumination areas P5 to P9 are controlled to be dimmed or extinguished. Therefore, the illumination area to which the front vehicle belongs is selectively shielded from the light so as to prevent dazzling the front vehicle, while the ADB light distribution enhanced in visibility in other illumination areas is executed.

Here, in order to illuminate a wider area in front of the automobile more brightly by the light emitted from each of the LED chips 301 to 309, a focus length of the projection lens 4 may be as short as possible, and an F value (=f/D) may be reduced. Therefore, in the embodiment, as illustrated in FIG. 6A, the focus length f is designed to be 57 mm, and the lens diameter D is designed to be 67 mm. As a result, the F value is approximately 0.84, and illuminance of the illumination area may be increased.

Meanwhile, in order to make the focus length f as short as possible in the projection lens 4, it is required to increase the positive refractive power of the first lens 41 and the third lens 43, and also increase the first inter-lens distance t1 and the second inter-lens distance t2. However, when the first inter-lens distance t1 and the second inter-lens distance t2 are increased in this manner, it is required to increase the negative refractive power of the second lens 42. By increasing this refractive power, astigmatism or high order coma aberration tends to be remarkable, and thus, the sharpness of the projection lens 4 is deteriorated.

When the chromatic aberration, astigmatism, or coma aberration in the projection lens becomes remarkable, a so-called "blur" occurs in a light source image emitted from the light source and projected in front of the automobile. Thus, a spot diameter of the converged light becomes large. Therefore, in the case of the lamp unit 2 according to the present disclosure, in hatched peripheral portions of each of the illumination areas P1 to P9 illustrated in FIG. 5, particularly in the vicinity portion apart from the lens optical axis Lx, the sharpness is deteriorated and the boundary of each of the illumination areas become ambiguous. Thus, the visibility and the light distribution quality are remarkably lowered. In addition, the front vehicle may be dazzled.

Therefore, after designing the first surface S1 to the sixth surface S6 of the projection lens 4 as described above, a change in sharpness is measured while changing the first inter-lens distance t1 and the second inter-lens distance t2 described above. Here, light having a predetermined light flux diameter is incident from the front of the projection lens 4, that is, from a left side of FIG. 6A, and a spot radius of light which is converged at a focus position Fo in a right side is measured. That is, the sharpness increases as the spot radius decreases. Here, the first inter-lens distance t1 and the second inter-lens distance t2 are made equal to each other, and measurement is performed as an inter-lens distance t common to both lenses.

Figure 6B:
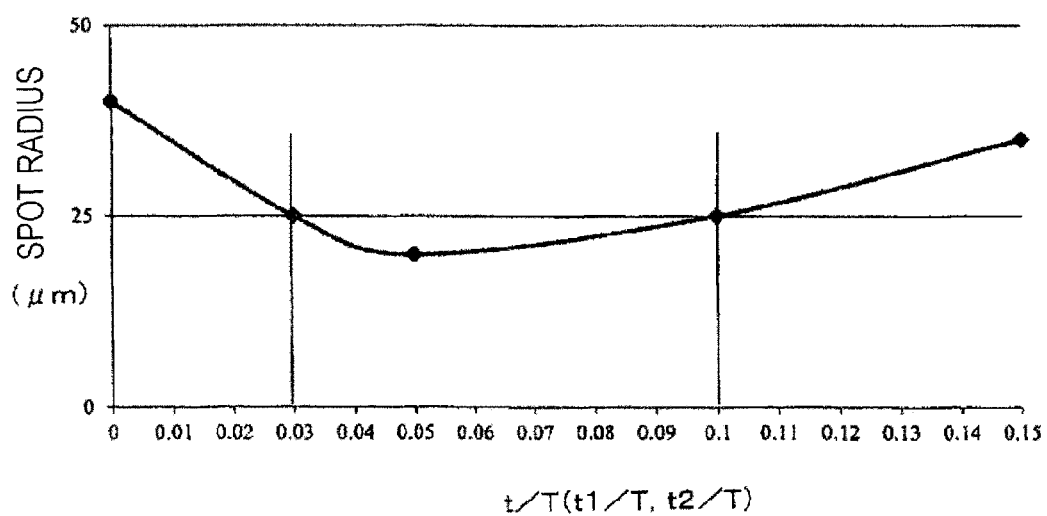

According to the measurement, as illustrated in FIG. 6B, it can be seen that, when a ratio of the inter-lens distance t to the total lens thickness T, that is, t/T is in a range of $0.03 < t/T < 0.1$, the spot radius may be reduced to approximately 25 um or less. That is, it is possible to obtain a projection lens with high sharpness.

When the value of t/T is made larger than the range, the spot radius increases and the sharpness of the projection lens 4 is deteriorated. Meanwhile, when the value of t/T becomes smaller than 0.03, the adjacent lenses approaches and interferes with each other, so that light outside the lens optical axis or light of pupil end does not pass therethrough and the light is not converged on the spot. Therefore, the sharpness of the projection lens 4 is deteriorated also for this reason.

Although not illustrated, even in a case where t1 and t2 are different, the spot radius may be suppressed by setting t1/T and t2/T to satisfy $0.03 < t1/T < 0.1$ and $0.03 < t2/T < 0.1$ as described above. Therefore, a projection lens with high sharpness may be obtained.

Figures 4, 5:
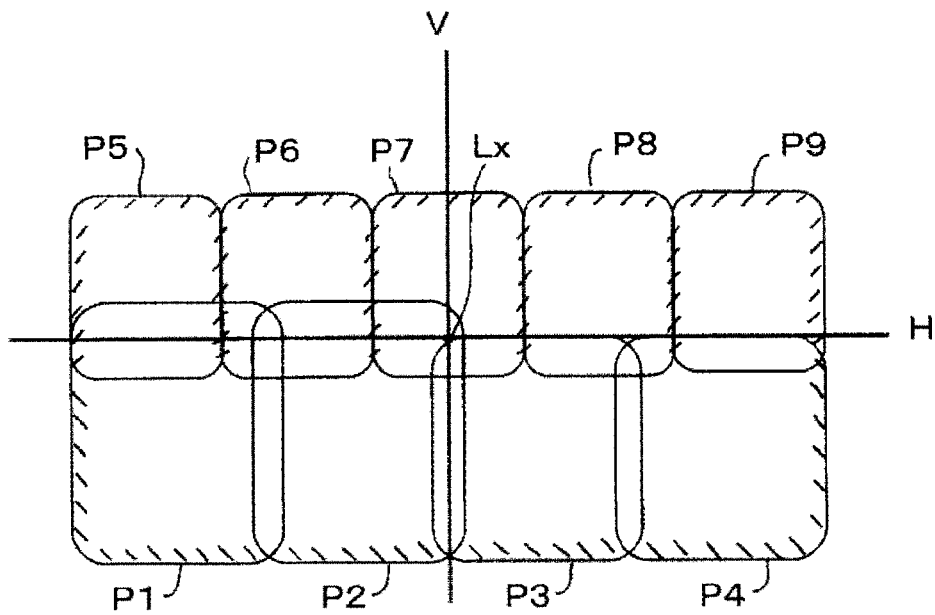
FIG. 4 is a view illustrating a design formula and design values of each surface of convex lenses and concave lenses.
FIG. 5 is a light distribution pattern view in which lights emitted from LED chips are combined.

By designing the projection lens 4 so as to satisfy the above-described relationship between the first inter-lens distance t1 and the second inter-lens distance t2, the sharpness of the hatched peripheral portions of each of the illumination areas P1 to P9 illustrated in FIG. 5 is improved and the boundary of each of the illumination areas becomes clear. Therefore, the visibility in the illumination areas is improved, and dazzling of the front vehicle existing in a boundary area of the illumination areas may be surely prevented.

In the above-described embodiment, descriptions have been made on an example in which the F value of the projection lens is 0.84. However, when the conditional formula related to the t/T is satisfied, it may be applied to a projection lens having an F value smaller than 1.0. Thus, the sharpness may be improved without enlarging the projection lens, that is, without extremely increasing the total lens thickness or lens diameter.

In the present embodiment, descriptions have been made on an example in which all of the first surface to the sixth surface are designed as aspherical surfaces. However, in the present disclosure, at least the first surface to the fifth surface may be aspherical surfaces, and thus, the sixth surface may be a spherical surface. Further, the present disclosure may also be applied to a case where the convex lenses of the first lens and the third lens and the concave lens of the second lens are meniscus lenses of which both surfaces are curved in the same direction.

In the present embodiment, descriptions have been made on an example in which the light source is constituted by nine LED chips to form the ADB light distribution. However, the present disclosure is not limited to the ADB light distribution, the number of LED chips or the number of the illumination areas, or furthermore, the pattern shape of each illumination area may be arbitrarily set. Further, the present disclosure may be applied to a head lamp using a micro electro mechanical systems (MEMS) mirror array as a light source.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
a light source; and
a projection lens that projects light emitted from the light source,
wherein the projection lens is constituted by a triplet lens including a first lens having a positive refractive power, a second lens having a negative refractive power, and a third lens having a positive refractive power, and a first inter-lens distance (t1) between the first lens and the second lens, a second inter-lens distance (t2) between the second lens and the third lens, and a total lens thickness (T) of the projection lens are in a relationship that satisfies $0.03 < t1/T < 0.1$ and $0.03 < t2/T < 0.1$, and
the light from the light source is emitted directly to the third lens and light from the third lens is emitted directly to the second lens.

2. The vehicle lamp of claim 1, wherein the first lens and the third lens are made of a light-transmissive material having a lower dispersion than that of the second lens.

3. The vehicle lamp of claim 1, wherein the first inter-lens distance (t1) is equal to the second inter-lens distance (t2).

4. The vehicle lamp of claim 2, wherein the first inter-lens distance (t1) is equal to the second inter-lens distance (t2).

5. The vehicle lamp of claim 1, wherein an F value of the projection lens, which is a ratio of a focus length (f) to a lens diameter (D), is smaller than 1.0.

6. The vehicle lamp of claim 2, wherein an F value of the projection lens, which is a ratio of a focus length (f) to a lens diameter (D), is smaller than 1.0.

7. The vehicle lamp of claim 3, wherein an F value of the projection lens, which is a ratio of a focus length (f) to a lens diameter (D), is smaller than 1.0.

8. The vehicle lamp of claim 4, wherein an F value of the projection lens, which is a ratio of a focus length (f) to a lens diameter (D), is smaller than 1.0.

9. The vehicle lamp of claim 1, wherein the light source is constituted by a plurality of light-emitting elements, and light emitted from the plurality of light-emitting elements is projected by the projection lens to form a plurality of corresponding illumination areas.

10. The vehicle lamp of claim 9, wherein the plurality of light-emitting elements are individually controlled to emit light, thereby performing an adaptive driving beam (ADB) light distribution control.

* * * * *